US012567600B2

(12) United States Patent
Grubbs et al.

(10) Patent No.: US 12,567,600 B2
(45) Date of Patent: Mar. 3, 2026

(54) SYSTEMS AND METHODS FOR ENHANCING SAFETY OF ELECTROCHEMICAL CELLS VIA ELECTROLYTE THICKENING

(71) Applicant: Safire Technology Group, Inc., McLean, VA (US)

(72) Inventors: Michael Grubbs, Fairfax, VA (US); Andrew Hanna, Knoxville, TN (US); Nader Shokair, Buena Park, CA (US)

(73) Assignee: Safire Technology Group, Inc., McLean, VA (US)

( * ) Notice: Subject to any disclaimer, the term of this patent is extended or adjusted under 35 U.S.C. 154(b) by 0 days.

(21) Appl. No.: 19/058,952

(22) Filed: Feb. 20, 2025

(65) Prior Publication Data

US 2025/0201890 A1 Jun. 19, 2025

Related U.S. Application Data

(63) Continuation of application No. PCT/US2024/059778, filed on Dec. 12, 2024, which
(Continued)

(51) Int. Cl.
*H01M 10/04* (2006.01)
*H01M 50/102* (2021.01)
(Continued)

(52) U.S. Cl.
CPC ......... *H01M 10/04* (2013.01); *H01M 50/102* (2021.01); *H01M 50/434* (2021.01);
(Continued)

(58) Field of Classification Search
None
See application file for complete search history.

(56) References Cited

U.S. PATENT DOCUMENTS

| | | | |
|---|---|---|---|
| 2,302,832 A | 11/1942 | Behrman | |
| 2,465,493 A | 3/1949 | Strickhouser et al. | |
| (Continued) | | | |

FOREIGN PATENT DOCUMENTS

| | | | |
|---|---|---|---|
| CN | 113508489 A | * | 10/2021 |
| CN | 116936935 A | | 10/2023 |
| (Continued) | | | |

OTHER PUBLICATIONS

Machine translation of CN113508489A (Year: 2025).*
(Continued)

*Primary Examiner* — Brian R Ohara
*Assistant Examiner* — M. T. Leonard
(74) *Attorney, Agent, or Firm* — Cooley LLP

(57) ABSTRACT

The embodiments described herein relate to a system including an electrochemical cell assembly including an electrolyte composition, and a transducer disposed proximate to the electrolyte composition. The transducer is configured to be selectively activated to deliver an amount of energy to the electrolyte composition to increase a shear thickening of the electrolyte composition. The electrolyte composition includes an electrolyte solvent, an electrolyte salt, and shear thickening particles.

22 Claims, 6 Drawing Sheets

Related U.S. Application Data is a continuation of application No. 18/916,224, filed on Oct. 15, 2024, now abandoned.

(60) Provisional application No. 63/610,221, filed on Dec. 14, 2023.

(51) Int. Cl.

| | |
|---|---|
| *H01M 50/434* | (2021.01) |
| *H01M 50/443* | (2021.01) |
| *H04R 1/02* | (2006.01) |
| *H04R 1/40* | (2006.01) |

(52) U.S. Cl.
CPC .......... *H01M 50/443* (2021.01); *H04R 1/028* (2013.01); *H04R 1/403* (2013.01)

(56) References Cited

U.S. PATENT DOCUMENTS

| | | | |
|---|---|---|---|
| 2,653,987 | A | 9/1953 | Baty |
| 5,100,567 | A | 3/1992 | Naae et al. |
| 5,470,357 | A | 11/1995 | Schmutz et al. |
| 5,707,763 | A | 1/1998 | Shimizu et al. |
| 6,476,317 | B1 | 11/2002 | Frederickson et al. |
| 6,803,138 | B2 | 10/2004 | Seabaugh et al. |
| 6,960,410 | B2 | 11/2005 | Kim et al. |
| 7,235,335 | B2 | 6/2007 | Kohno et al. |
| 7,261,833 | B2 | 8/2007 | Seabaugh et al. |
| 7,498,276 | B2 | 3/2009 | Wagner et al. |
| 7,504,181 | B2 | 3/2009 | Kohno et al. |
| 7,594,181 | B2 | 9/2009 | Rothwein et al. |
| 7,655,361 | B2 | 2/2010 | Kim et al. |
| 7,659,036 | B2 | 2/2010 | Kim et al. |
| 7,825,045 | B1 | 11/2010 | Wagner et al. |
| 8,357,433 | B2 | 1/2013 | Stevens et al. |
| 8,550,161 | B2 | 10/2013 | Chen et al. |
| 8,956,688 | B2 | 2/2015 | Li et al. |
| 9,570,748 | B2 | 2/2017 | Dudney et al. |
| 9,590,274 | B2 | 3/2017 | Veith et al. |
| 9,760,846 | B1 | 9/2017 | Brandmaier et al. |
| 9,837,665 | B2 | 12/2017 | Dudney et al. |
| 10,044,038 | B2 | 8/2018 | Bridges et al. |
| 10,263,246 | B2 | 4/2019 | Dudney et al. |
| 10,347,934 | B2 | 7/2019 | Veith et al. |
| 10,347,945 | B2 | 7/2019 | Veith et al. |
| 10,424,792 | B2 | 9/2019 | Dudney et al. |
| 10,637,100 | B2 | 4/2020 | Armstrong et al. |
| 10,879,533 | B2 | 12/2020 | Bridges et al. |
| 11,233,271 | B2 | 1/2022 | Armstrong et al. |
| 11,824,162 | B2 | 11/2023 | Armstrong et al. |
| 11,824,163 | B2 | 11/2023 | Armstrong et al. |
| 12,237,469 | B2 | 2/2025 | Armstrong et al. |
| 2002/0110732 | A1 | 8/2002 | Coustier et al. |
| 2004/0151985 | A1 | 8/2004 | Munshi |
| 2005/0208383 | A1 | 9/2005 | Totsuka et al. |
| 2006/0134526 | A1 | 6/2006 | Han et al. |
| 2006/0234572 | A1 | 10/2006 | Wagner et al. |
| 2007/0015053 | A1 | 1/2007 | Morris |
| 2007/0082261 | A1 | 4/2007 | Lee |
| 2007/0178374 | A1 | 8/2007 | Aizenberg et al. |
| 2007/0218352 | A1 | 9/2007 | Kohno et al. |
| 2007/0282053 | A1 | 12/2007 | Wagner et al. |
| 2008/0274344 | A1 | 11/2008 | Vieth et al. |
| 2009/0004413 | A1 | 1/2009 | Wagner et al. |
| 2009/0059474 | A1 | 3/2009 | Zhamu et al. |
| 2009/0111002 | A1 | 4/2009 | Lambrech et al. |
| 2009/0155678 | A1 | 6/2009 | Less et al. |
| 2011/0217585 | A1 | 9/2011 | Wang et al. |
| 2011/0250477 | A1 * | 10/2011 | Yoshida ................ B60L 3/0053 |
| | | | 429/61 |
| 2012/0070746 | A1 | 3/2012 | Mikhaylik et al. |
| 2012/0231321 | A1 | 9/2012 | Huang et al. |
| 2012/0295149 | A1 | 11/2012 | Xie |
| 2012/0308872 | A1 | 12/2012 | Huang |
| 2013/0108776 | A1 | 5/2013 | Li et al. |

| | | | |
|---|---|---|---|
| 2014/0013584 | A1 | 1/2014 | Wang et al. |
| 2014/0141312 | A1 | 5/2014 | Kim |
| 2014/0211370 | A1 | 7/2014 | Seymour et al. |
| 2014/0272532 | A1 | 9/2014 | Park et al. |
| 2014/0363738 | A1 | 12/2014 | Blanc et al. |
| 2015/0086875 | A1 | 3/2015 | Yoshida |
| 2015/0099185 | A1 | 4/2015 | Joo et al. |
| 2015/0117540 | A1 | 4/2015 | Morimoto |
| 2015/0118540 | A1 | 4/2015 | Fujiwara et al. |
| 2015/0155534 | A1 | 6/2015 | Tsutsui et al. |
| 2015/0295216 | A1 | 10/2015 | Okuno |
| 2015/0311567 | A1 | 10/2015 | Todorof |
| 2015/0318555 | A1 | 11/2015 | Oku et al. |
| 2015/0333311 | A1 | 11/2015 | Kim et al. |
| 2015/0364263 | A1 | 12/2015 | Petrzilek et al. |
| 2015/0372271 | A1 | 12/2015 | Orilall et al. |
| 2015/0372350 | A1 | 12/2015 | Solomon et al. |
| 2016/0013463 | A1 | 1/2016 | Roumi et al. |
| 2016/0013515 | A1 | 1/2016 | Lee et al. |
| 2016/0056437 | A1 | 2/2016 | Huang et al. |
| 2016/0093917 | A1 | 3/2016 | Veith et al. |
| 2016/0164060 | A1 | 6/2016 | Zhang et al. |
| 2017/0104236 | A1 | 4/2017 | Veith et al. |
| 2017/0301901 | A1 | 10/2017 | Hass et al. |
| 2018/0019457 | A1 | 1/2018 | Alharizah et al. |
| 2018/0034090 | A1 * | 2/2018 | Chiang .................. B60L 50/72 |
| 2019/0181504 | A1 | 6/2019 | Veith et al. |
| 2019/0326632 | A1 | 10/2019 | Armstrong et al. |
| 2020/0287243 | A1 | 9/2020 | Armstrong et al. |
| 2020/0400614 | A1 * | 12/2020 | Deng .................. G01N 29/032 |
| 2022/0123361 | A1 * | 4/2022 | Lee .................... H01M 10/058 |
| 2022/0158240 | A1 | 5/2022 | Armstrong et al. |
| 2022/0166065 | A1 | 5/2022 | Armstrong et al. |
| 2022/0399588 | A1 * | 12/2022 | Khokhlov ............. H01M 4/244 |
| 2023/0253637 | A1 * | 8/2023 | Gao .................... H10N 30/302 |
| | | | 429/129 |
| 2024/0274876 | A1 | 8/2024 | Armstrong et al. |

FOREIGN PATENT DOCUMENTS

| | | | |
|---|---|---|---|
| EP | 3091244 | A1 | 11/2016 |
| JP | 2010129244 | A | 6/2010 |
| JP | 2012195259 | A | 10/2012 |
| WO | WO-2003022085 | A2 | 3/2003 |
| WO | WO-2004103231 | A1 | 12/2004 |
| WO | WO-2007146703 | A2 | 12/2007 |
| WO | WO-2012081173 | A1 | 6/2012 |
| WO | WO-2018109626 | A1 | 6/2018 |
| WO | WO-2019113365 | A1 | 6/2019 |

OTHER PUBLICATIONS

Babu et al. "Synthesis of polymer grafted magnetite nanoparticle with the highest grafting density via controlled radical polymerization." Nanoscale research letters. Sep. 2009; 4: 1090-1002.

Barnes HA "Shear-thickening ("Dilatancy") in suspensions of nonaggregating solid particles dispersed in Newtonian liquids." Journal of Rheology. Feb. 1, 1989;33(2):329- 366.

Bergstorm L "Chapter 9—Colloidal Processing of Ceramics," in Handbook of Applied Surface and Colloid Chemistry, Edited by K. Holmberg. John Wiley & Sons, LTD, 2001; 18 pages.

Bogush et al. "Preparation of Monodisperse Silica Particles: Control of Size and Mass Fraction." Journal of Non-Crystalline Solids. Aug. 1, 1988; 104(1): 95-106.

Brown et al. "Generality of shear thickening in dense suspensions." Nature Materials. Mar. 2010;9(3):220-224.

Chou et al. "Effect of dispersants on the rheological properties and slip casting of concentrated alumina slurry." Journal of the American Ceramic Society. Sep. 1989;72(9):1622-1627.

Co-pending U.S. Appl. No. 18/916,224, inventors Grubbs; Michael et al., filed on Oct. 15, 2024.

Declaration Under 37 C.F.R. 1.132, filed in U.S. Appl. No. 16/836,297 on Aug. 12, 2021, 33 pages.

Dehmoune et al. "Shear thickening in three surfactants of the alkyl family C n TAB: small angle neutron scattering and rheological study." Langmuir. Jul. 7, 2009;25(13):7271-7278.

(56)     References Cited

OTHER PUBLICATIONS

Ding et al. "Smart multifunctional fluids for lithium ion batteries: enhanced rate performance and intrinsic mechanical protection." Scientific Reports. Aug. 21, 2013;3(1):2485; 7 pages.

Final Office Action for U.S. Appl. No. 15/958,446, dated Jan. 13, 2020, 8 pages.

Fischer et al. "Dynamic properties of sandwich structures with integrated shear-thickening fluids." Smart Materials and Structures. Sep. 8, 2006;15(5):1467-1475.

Gamez-Corrales et al., "Shear-thickening dilute surfactant solutions: equilibrium structure as studied by small-angle neutron scattering." Langmuir. Sep. 28, 1999;15(20):6755-6763.

International Preliminary Report on Patentability for Application No. PCT/IB2017/057762, dated Jun. 18, 2019, 12 pages.

International Preliminary Report on Patentability for Application No. PCT/US2018/064324, dated Jun. 9, 2020, 16 pages.

International Search Report and Written Opinion for Application No. PCT/US2018/064324, dated Apr. 26, 2019, 20 pages.

International Search Report and Written Opinion for Application No. PCT/US2024/059778, dated Feb. 27, 2025, 16 pages.

International Search Report and Written Opinion for Application No. PCT/IB2017/057762, dated Mar. 9, 2018, 13 pages.

Kandi et al. "Effect of dispersant on the rheological properties of gelcast fused silica ceramics," in IOP Conference Series: Materials Science and Engineering 2016;149(1):012063, 9 pages.

Matyjaszewski, K. "Atom transfer radical polymerization (ATRP): current status and future perspectives." Macromolecules. May 22, 2012;45(10):4015-4039.

Non-Final Office Action for U.S. Appl. No. 15/958,446, dated Sep. 20, 2019, 16 pages.

Non-Final Office Action for U.S. Appl. No. 16/836,297, dated May 13, 2021, 10 pages.

Non-Final Office Action for U.S. Appl. No. 17/570,972, dated Mar. 22, 2023, 12 pages.

Non-Final Office Action for U.S. Appl. No. 17/570,982, dated Mar. 22, 2023, 23 pages.

Non-Final Office Action for U.S. Appl. No. 18/383,268, dated Aug. 13, 2024, 9 pages.

Raghavan et al. "Rheology of silica dispersions in organic liquids: new evidence for solvation forces dictated by hydrogen bonding." Langmuir. Oct. 17, 2000;16(21):7920-7930.

Shivapooja et al. "ARGET-ATRP synthesis and characterization of PNIPAAm brushes for quantitative cell detachment studies." Biointerphases. Dec. 2012;7:32; 9 pages.

Ye et al. "Influence of surfactants on shear-thickening behavior in concentrated polymer dispersions." Journal of Nanoparticle Research. Dec. 2013; 15(2122):1-9.

Zhang et al. "The rheology of shear thickening fluid (STF) and the dynamic performance of an STF-filled damper." Smart Materials and Structures. Apr. 29, 2008;17(3):035027, 8 pages.

* cited by examiner

SYSTEMS AND METHODS FOR ENHANCING SAFETY OF ELECTROCHEMICAL CELLS VIA ELECTROLYTE THICKENING

CROSS REFERENCE TO RELATED APPLICATIONS

This application is a continuation of PCT Application No. PCT/US2024/059778, filed Dec. 12, 2024, and entitled "Systems and Methods for Enhancing Safety Of Electrochemical Cells Via Electrolyte Thickening", which is a continuation of U.S. patent application Ser. No. 18/916,224, filed Oct. 15, 2024, and entitled "Electrolyte Thickening", which claims priority to and for the benefit of U.S. Provisional Application No. 63/610,221, entitled "Electrolyte Thickening", and filed Dec. 14, 2023, the contents of which are incorporated herein by reference in their entirety.

STATEMENT OF GOVERNMENT SUPPORT

This invention was made with government support under DE-AC05-00OR22725 awarded by the U.S. Department of Energy. The Government has certain rights in this invention pursuant to Strategic Partnership Projects Agreement NFE-23-09487.

BACKGROUND

The statements in this section merely provide background information related to the present disclosure and may not constitute prior art.

Stability and safety of the electrolyte system in batteries is a constant problem caused by volatility and flammability. An electrical short between the cathode and the anode generally results in a large amount of energy being released spontaneously. Such an energy release can cause thermal transients and electrical transients.

SUMMARY

In some embodiments, an electrochemical cell assembly includes an anode disposed on an anode current collector, a cathode disposed on a cathode current collector, an electrolyte composition disposed between the anode and the cathode, and a transducer disposed proximate to the electrolyte composition. The electrolyte composition includes an electrolyte solvent, an electrolyte salt, and a plurality of shear thickening particles. The transducer is configured to be selectively activated to deliver an amount of energy to the electrolyte composition to cause the plurality of shear thickening particles to increase viscosity of the electrolyte composition.

In some embodiments, a system includes an electrochemical cell assembly, and a controller. The electrochemical cell assembly includes an anode disposed on an anode current collector, a cathode disposed on a cathode current collector, an electrolyte composition disposed between the anode and the cathode, and a transducer disposed proximate to the electrolyte composition. The electrolyte composition includes an electrolyte solvent, an electrolyte salt, and a plurality of shear thickening particles configured to increase viscosity of the electrolyte composition upon receiving an energy. The controller is operatively coupled to the transducer. The controller is configured to interpret an event signal indicative of a cell parameter or an external event, and in response to the cell parameter being outside of a predetermined range or exceeding threshold value, or the external event being a predetermined event, generate a signal configured to actuate the transducer. The activation is configured to cause the transducer to generate an amount of energy that is communicated to the plurality of shear thickening particles to cause the shear thickening of the electrolyte composition.

In some embodiments, a system includes an electrochemical cell including an electrolyte composition, and a transducer configured to convert electrical energy into mechanical energy. The electrolyte composition includes an electrolyte solvent, an electrolyte salt, and a plurality of shear thickening particles. The mechanical energy causes the plurality of shear thickening particles to increase viscosity of the electrolyte composition.

In some embodiments, alone or in combination with the aforementioned, the electrolyte composition may have a first viscosity, and the transducer is configured to be selectively activated to deliver an amount of energy to the electrolyte composition to stimulate the shear thickening particles to cause the electrolyte composition to have a second viscosity greater than the first viscosity.

In some embodiments, alone or in combination with the aforementioned, the techniques described herein relate to a system where the transducer forms a geometry that mimics a shape of one or more portions of the electrochemical cell, the techniques described herein relate to a system where the transducer covers the one or more portions of the electrochemical cell, the techniques described herein relate to a system where the one or more portions of the electrochemical cell form an axis and the one or more portions of the electrochemical cell surround the transducer in a radial direction from the axis, the techniques described herein relate to a system where the energy causes a reduction in ionic conductivity between the electrolyte solvent and the electrolyte salt where the techniques described herein relate to a system, and the energy is mechanical and forms one or more wave that propagate from the transducer, the techniques described herein relate to a system where the one or more wave has a frequency greater than 16 Hertz (Hz) and less than 20 kHz, the techniques described herein relate to a system where a distance between the transducer and the plurality of ceramic particles is less than a predetermined quantity, and the predetermined quantity is based on an electrical limit of the transducer, the techniques described herein relate to a system where an amplitude of the electric current or a magnitude of the electric current is less than the electrical limit and the one or more wave that propagates from the transducer, and an amplitude of the one or more wave is greater than zero as the one or more wave reaches the plurality of ceramic particles or the magnitude of the one or more wave is greater than zero as the one or more wave reaches the ceramic particles, the techniques described herein relate to a system where the amplitude of the one or more wave is greater than a predetermined threshold as the one or more wave reaches the plurality of ceramic particles or the magnitude of the one or more wave is greater than a predetermined threshold as the one or more wave reaches the ceramic particles, the techniques described herein relate to a system where the plurality of ceramic particles are sized in a range of 50 nanometers to micrometers, and the plurality of ceramic particles have an absolute zeta potential of greater than 40 millivolts, the techniques described herein relate to a system where the transducer is one or more of an acoustic transducer, a piezoelectric transducer, a haptic transducer, a mechanical actuator, or an electric machine transducer, the techniques described herein relate to a system, further including: a controller configured to provide the electric current, the techniques described herein relate to a system where the electric current has a frequency, and the frequency is based on a frequency response of the ceramic particles, the techniques described herein relate to a system where the transducer includes elements spaced to propagate the energy based on a frequency response of the ceramic particles, the techniques described herein relate to a system where the elements include electrical connectors distributed on a surface formed by the transducer, and a controller configured to provide the electric current connects with the elements through the electrical connectors on the surface, the techniques described herein relate to a system where one or more of the electrolyte solvent, the electrolyte salt, or the plurality of ceramic particles form a membrane of the electrochemical cell, the techniques described herein relate to a system where the energy causes an increase in an acquired shear modulus of the electrolyte solvent and the electrolyte salt, In some embodiments, alone or in combination with the aforementioned, the techniques described herein relate to a system including: an electrochemical cell including one or more of an electrolyte solvent and an electrolyte salt; and a transducer configured to convert electric current into energy where the energy increases viscosity of the one or more of the electrolyte solvent or the electrolyte salt.

In some embodiments, alone or in combination with the aforementioned, the techniques described herein relate to a system including: an electrochemical cell including a separator and an electrolyte, wherein the electrochemical cell includes an anode and a cathode, and the separator facilitates ionic conductivity between the anode and the cathode; and a transducer configured to convert electric current into energy, wherein the energy increases viscosity of the electrolyte.

In some embodiments, alone or in combination with the aforementioned, the techniques described herein relate to a method including: receiving an indication of an event; and converting electric current into energy, wherein the energy causes the shear thickening particles (e.g., ceramic particles) of an electrochemical cell to increase viscosity of the electrolyte composition.

In some embodiments, alone or in combination with the aforementioned, the techniques described herein relate to a method where the event is predicted to cause one or more of a thermal transient of the electrochemical cell or an electrical transient of the electrochemical cell, the techniques described herein relate to a method where the event is an impact associated with a chassis supporting the electrochemical cell, the techniques described herein relate to a method where the event is a predicted impact associated with a chassis supporting the electrochemical cell, the techniques described herein relate to a method where the event is an electrical anomaly of the electrochemical cell, the techniques described herein relate to a method where the electric current has a frequency, and the frequency is based on a frequency response of the ceramic particles, the techniques described herein relate to a method, further including: providing the electric current, the techniques described herein relate to a method where the energy causes a suppression of ionic conductivity of the electrolyte solvent and the electrolyte salt, the techniques described herein relate to a method where the energy is mechanical and forms one or more wave that propagate from a transducer, the techniques described herein relate to a method where the one or more wave has a frequency greater than 16 Hertz (Hz) and less than 20 kHz, the techniques described herein relate to a method where a distance between the transducer and the plurality of ceramic particles is less than a predetermined quantity, and the predetermined quantity is based on an electrical limit of the transducer.

In some embodiments, alone or in combination with the aforementioned, the techniques described herein relate to a method where an amplitude of electric current or a magnitude of the electric current is less than the electrical limit and the one or more wave that propagate from the transducer, and an amplitude of the one or more wave is greater than zero as the one or more wave reaches the plurality of ceramic particles or the magnitude of the one or more wave is greater than zero as the one or more wave reaches the ceramic particles, the techniques described herein relate to a method where the amplitude of the one or more wave is greater than a predetermined threshold as the one or more wave reaches the plurality of ceramic particles or the magnitude of the one or more wave is greater than a predetermined threshold as the one or more wave reaches the ceramic particles, the techniques described herein relate to a method, wherein the energy causes an increase in an acquired shear modulus of the electrolyte solvent and the electrolyte salt.

BRIEF DESCRIPTION OF THE DRAWINGS

In order that the disclosure may be well understood, there will now be described various forms thereof, given by way of example, reference being made to the accompanying drawings, in which.

Figure 1A:
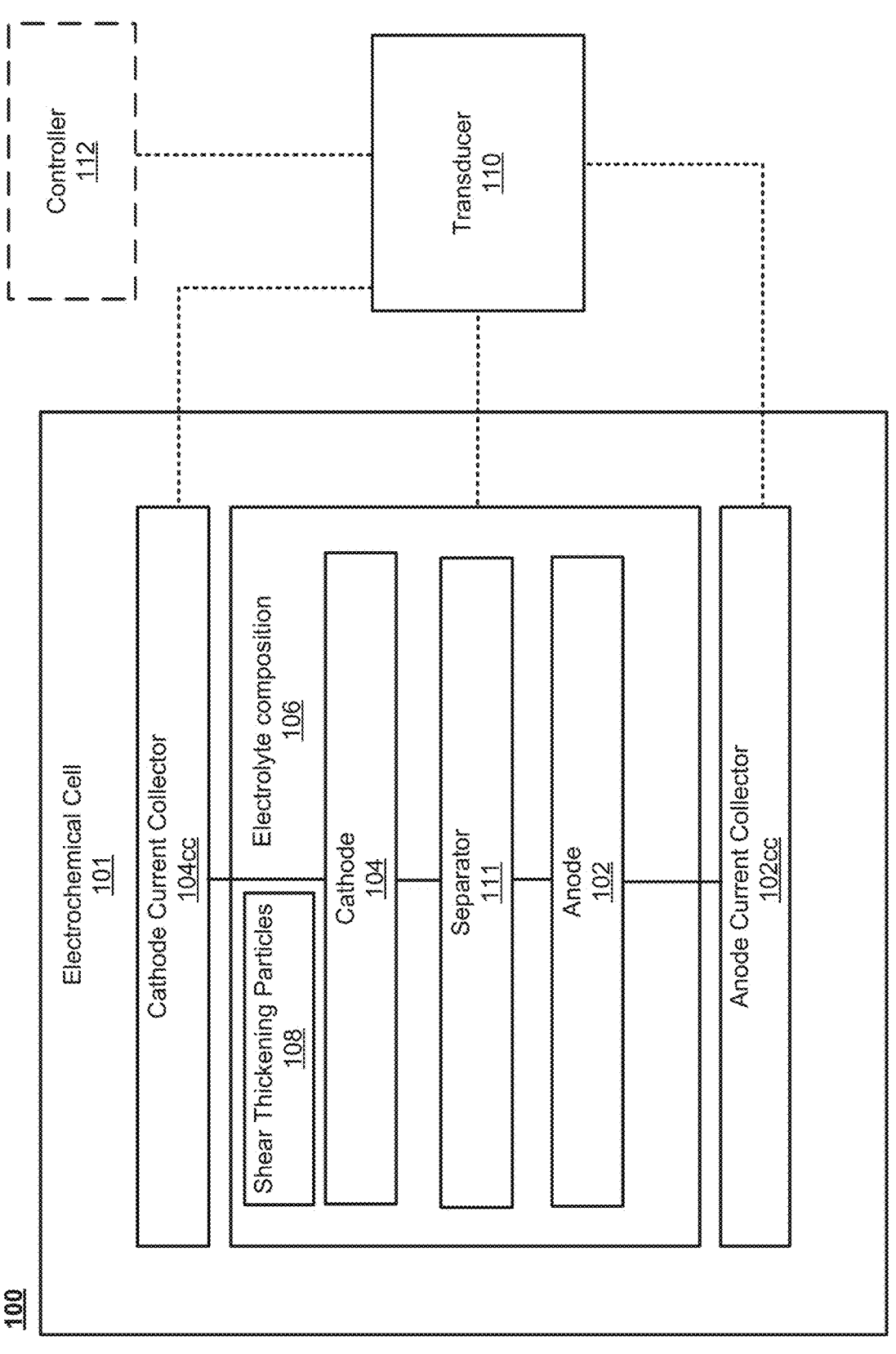
FIG. 1A is a block diagram of an electrochemical cell system, according to an embodiment.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

An electrochemical cell is made of one or more cells with each cell providing a predetermined voltage based on a conversion of chemical energy to electrical energy specific to the potentials of various anode and cathode materials. In one or more variation, the chemical energy is stored in an electrode composition. In such a variation, the electrolyte composition is situated between an anode of the electrochemical cell and a cathode of the electrochemical cell, providing ionic conductivity between the anode and the cathode. For example, the electrolyte composition may saturate and selectively traverse a separator or membrane (e.g., semipermeable) between the anode and the cathode.

During transients (e.g., physical, electrical, chemical), an increase of the viscosity associated with the electrochemical may be increased. For example, a shear thickening associated with the electrolyte is increased to change the ionic conduction, physical attributes, or parameters associated with the electrolyte. in one or more variation, ceramic particles are dispersed within the electrolyte to transform the electrolyte from a Newtonian (constant viscosity at different shear rates and constant temperature) behavior to a non-Newtonian (variable viscosity under force) behavior. As the electrochemical cell is exposed to energy (e.g., mechanical energy, acoustic energy, elastic energy, thermal energy, magnetic energy), the plurality of ceramic particles agglomerate to increase the viscosity (e.g., thicken) and the shear modulus of the electrolyte composition.

In the provided variations, the electrolyte composition includes one or more of an electrolyte solvent, electrolyte salt, and ceramic particles. Suitable electrolyte solvents include, but are not limited to, for example, ethylene carbonate, dimethyl carbonate, propylene carbonate, dimethoxyethane, dioxolane, ethyl methyl carbonate, various ionic liquids, and combinations of any of the foregoing. Examples of ionic liquids include, but are not limited to, for example, N-alkyl-N-methylpyrrolidinium bis(trifluoromethanesulfonyl)-imide, N-alkyl-N-methylpyrrolidinium bis (fluorosulfonyl)imide, and 1-ethyle-3-methyl-imidazolium bis(trifluoromethanesulfonyl)imide. A mixture of ethylene carbonate and dimethyl carbonate is often used as a solvent in preparing electrolytes, a commonly used mixture being 3:7 weight % ratio mixture of ethylene carbonate and dimethyl carbonate (for example, a mixture containing 30 grams ethylene carbonate and 70 grams dimethyl carbonate).

Suitable electrolyte salts include, but are not limited to, for example, lithium hexafluorophosphate, lithium triflate, lithium perchlorate, lithium tetrafluoro borate, lithium hexafluoro lithium arsenate, lithium bis(trifluoromethane sulphone)imide, and lithium bis(oxalate) borate, and combinations of any of the foregoing. Sodium salts can also be used, and can include, for example, sodium perchlorate, sodium tetrafluoro borate, sodium hexafluoro arsenate, sodium bis(trifluoromethane sulphone)imide, sodium bis (oxalate)borate, and combinations of any of the foregoing.

Electrodes described herein can be used with various conventional electrode systems. Anode materials can include, for example, graphite, Li, Si, Sn, $Cu_2Sb$, $Mo_3Sb_7$, Sb, $Cu_6Sn_5$, Al, Pt, Au, In, and the like. Cathode materials can include, for example, $LiNi_{113}Mn_{113}Co_{113}O_2$ (NMC), $LiCoO_2$, $Li(CoAl)_1O_2$, $Li_{1.2}(MnNiCo)_{0.8}O_2$ (AKA Lithium rich), $LiMn_2O_4$, $Li_2MnO_3$, $LiMn_{1.5}Ni_{0.5}O_4$, $LiFePO_4$, $LiCoPO_4$, $LiNiPO_4$, $LiNiO_2$, Li—V—O, $Li_2Si$—Mn, Fe, Ni—$O_4$, $NaFeO_2$, $NaCrO_2$, $Na(Fe,Mn,Ni,Co)O_2$, $Na_2(Ni, Fe,Mn)O_4$, and the like.

The plurality of shear thickening particles (e.g., ceramic particles) may have a polydispersity index of no greater than 0.8, an average particle size of in a range of about 50 nm to about 1 μm, inclusive and an absolute zeta potential of greater than ±40 mV at applicable pH ranges. The plurality of shear thickening particles may include at least one material selected from the group consisting of $TiO_2$, $Al_2O_3$, $ZrO_2$, $Y_2O_3$, $HfO_2$, $GeO_2$, $Sc_2O_3$, $CeO_2$, MgO, and $SiO_2$. The plurality of shear thickening particles may include silica. In some embodiments, the shear thickening particles may include ceramic particles. Non-ceramic particles are also contemplated by this disclosure.

Figure 1B:
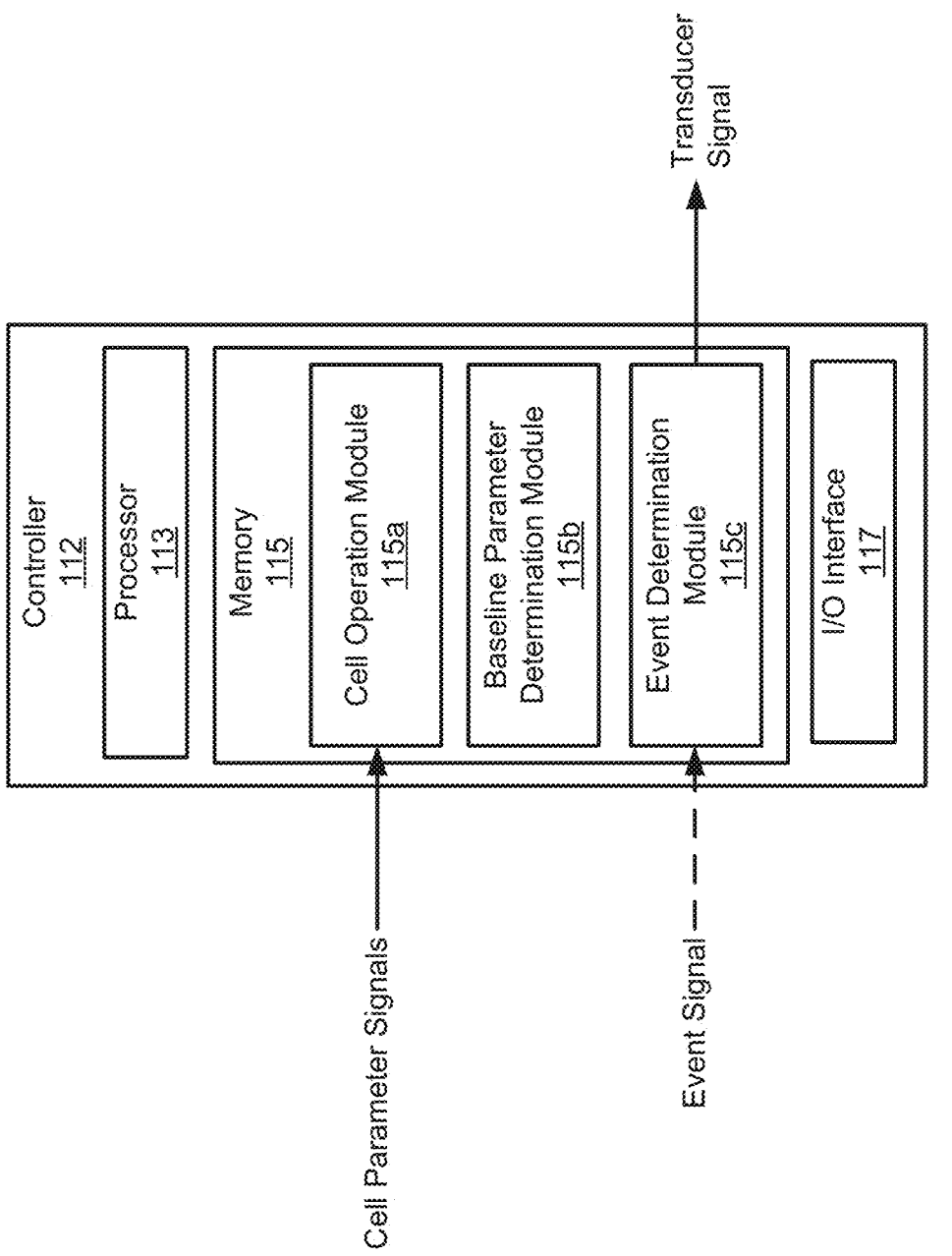
FIG. 1B is a block diagram of a controller that may be included in the electrochemical cell system of FIG. 1A, according to an embodiment.

FIGS. 1A-1B are block diagrams of an electrochemical cell system 100 and components thereof, according to an embodiment. FIG. 1A shows the electrochemical cell system 100. As shown, the electrochemical cell system 100 includes an electrochemical cell 101, a transducer 110, and an optional controller 112. The electrochemical cell 101 includes an anode 120 disposed on an anode current collector 102cc, a cathode 104 disposed on a cathode current collector 104cc, an electrolyte composition 106 disposed between the anode 102 and the cathode 104, and a separator 111 disposed between the anode 102 and the cathode 104. The electrolyte composition 106 includes shear thickening particles 108. The separator 111 have a surface and a plurality pores defined in the surface, the plurality of pores being distributed throughout the surface.

It is important to note that the construction and arrangement of the components of the electrochemical cell system 100 shown in FIGS. 1A and 1B are illustrative only. It should be appreciated that many modifications are possible (e.g., variations in sizes, dimensions, structures, shapes and proportions, orientations, and/or the like) without materially departing from the novel teachings and advantages of the subject matter described herein. For example, the plurality of shear thickening particles 108 are suspended and/or dispersed within the electrolyte composition 106. Accordingly, in some embodiments, the plurality of shear thickening particles may be suspended and/or dispersed in at least one of the regions between the anode and the separator or between the cathode and the separator. In some embodiments, the plurality of shear thickening particles 108 can be further disposed on or over the surface of the separator 111. In some embodiments, the plurality of shear thickening particles 108 may be at least partially disposed in or within the pores of the separator. In some embodiments, the plurality of shear thickening particles 108 may be disposed on or over the surface of the separator 111, and at least partially disposed in or within the pores of the separator 111.

The transducer 110 can be communicatively and/or physically coupled to at least one of the anode current collector 102cc, the cathode current collector 104cc, and/or the electrolyte composition 106. The transducer is disposed proximate to the electrolyte composition. In some embodiments, the transducer is configured to be selectively activated to deliver an amount of energy to the electrolyte composition to cause the shear thickening particles to increase a shear thickening of the electrolyte composition.

In some embodiments, the controller 112 can be coupled to the anode current collector 102cc, the cathode current collector 104cc, and/or the electrolyte composition 106 via one or more tabs coupled to the anode current collector 102cc, the cathode current collector 104cc, and/or the electrolyte composition 106. In some embodiments, the electrochemical cell system 100 can include the controller 112 that is electrically communicated with the transducer 110.

In some embodiments, the separator 111 may be electrically insulating. In some embodiments, the separator 111 may be a conventional separator configured to provide electrical isolation between an anode and a cathode. As used herein, the term "conventional separator" refers to an ion permeable membrane, substrate, film, or layer(s) that provides electrical isolation between an anode and a cathode, while allowing charge carrying ions to pass therethrough.

That is, in some embodiments, the separator 111 may be a conventional separator that permits the transport of ions therethrough, while preventing the transfer of electrons.

The separator 111 can be selected from many suitable designs and materials. The separator 111 can be made from polymeric, glass fiber, ceramic and other suitable materials. In some embodiments, the separator 111 can be in a form of a membrane, a film, or a base layer. In some embodiments, the separator 111 may be a single layer (monolayer) or a multilayer (such as bi-layer or tri-layer or other multi-layer) membrane. In some embodiments, the separator 111 can be in a form of a porous polymer membrane. In some embodiments, the separator 111 is a porous polyolefin membrane. Exemplary polyolefins include, but are not limited to, polypropylene (PP), polyethylene (PE), polymethyl pentene (PMP) copolymers of any of the foregoing and mixtures thereof. In some embodiments, the separator 111 includes at least one of polypropylene (PP), polyethylene (PE), or polymethyl pentene (PMP). In some embodiments, the separator 111 may comprise multiple layers, with each layer independently formed from a polyolefin. In some embodiments, the separator 111 can be selected from Celgard® brand membranes available from Celgard, LLC of Charlotte, N.C.

In some embodiments, porosity of the separator 111 can decrease due to the introduction of the shear thickening particles 108 into the pores of the separator 111. It is desirable not to block all the pores so that liquid electrolyte or gasses are able to penetrate totally through the structure. In some embodiments, the porosity of the separator 111 within the electrochemical cell system 100 can be from 20% to 60%. The porosity of the separator 111 needs to allow for ion transport across the separator 111 while performing the shear thickening function.

In some embodiments, the separator 111 is disposed between the anode 102 and the cathode 104 such that a first electrolyte composition disposed between the anode 102 and the separator, and a second electrolyte composition disposed between the cathode 104 and the separator. In some embodiments, at least one of the first electrolyte or the second electrolyte includes the plurality of shear thickening particles. In some embodiments, the plurality of shear thickening particles includes a first plurality of shear thickening particles disposed between the anode 102 and the separator, and a second plurality of shear thickening particles disposed between the cathode 104 and the separator. In some embodiments, the first plurality of shear thickening particles and the second plurality of ceramic particles include different type of shear thickening particles. In some embodiments, the first plurality of shear thickening particles and the second plurality of ceramic particles include same type of shear thickening particles.

The anode 102, anode current collector 102cc, cathode 104, and cathode current collector 104cc may be selected from any type or configuration of anodes, anode current collectors, cathodes, and cathode current collectors. Electrodes described herein can be used with various conventional electrode systems. Anode materials can include, for example, graphite, Li, Si, Sn, $Cu_2Sb$, $Mo_3Sb_7$, Sb, $Cu_6Sn_5$, Al, Pt, Au, In, and the like. Cathode materials can include, for example, $LiNi_{1/3}Mn_{1/3}Co_{1/3}O_2$ (NMC), $LiCoO_2$, $Li(CoAl)_1O_2$, $Li_{1.2}(MnNiCo)_{0.8}O_2$ (AKA Lithium rich), $LiMn_2O_4$, $Li_2MnO_3$, $LiMn_{1.5}Ni_{0.5}O_4$, $LiFePO_4$, $LiCoPO_4$, $LiNiPO_4$, $LiNiO_2$, Li—V—O, $Li_2Si$—Mn, Fe, Ni—$O_4$, $NaFeO_2$, $NaCrO_2$, $Na(Fe,Mn,Ni,Co)O_2$, $Na_2(Ni,Fe,Mn)O_4$, and the like. In some embodiments, the anode current collector 102cc and/or the cathode current collector 104cc can be composed of copper, aluminum, titanium, or other metals that do not form alloys or intermetallic compounds with lithium, carbon, and/or coatings comprising such materials disposed on another conductor.

In some embodiments, the electrolyte composition 106 may include an electrolyte solvent, an electrolyte salt, and a plurality of shear thickening particles 108 dispersed and/or suspended within the electrolyte composition 106. The anode 102 and/or cathode 104 may, in some embodiments, have a porous structure, allowing the electrolyte solvent to penetrate the pores of the anode and/or cathode. In some embodiments, the plurality of shear thickening particles 108 may be disposed on or over the surfaces of the anode and/or cathode materials. The shear thickening particles 108 may not penetrate the porous structure of the anode 102 and cathode 104. In some embodiments, the electrolyte solvent and, optionally, the electrolyte salt, may penetrate through the pores of the anode and cathode.

In some embodiments, the electrolyte composition 106 is an ionically conductive composition. In some embodiments, the electrolyte composition 106 can include an electrolyte salt. Any conventional lithium ion electrochemical electrolyte salt can be used for the ionically conductive composition 1400. Suitable electrolyte salts include, but are not limited to, for example, lithium hexafluorophosphate, lithium triflate, lithium perchlorate, lithium tetrafluoro borate, lithium hexafluoro lithium arsenate, lithium bis(trifluoromethane sulphone)imide, and lithium bis(oxalate)borate, and combinations of any of the foregoing. Sodium salts can also be used, and can include, for example, sodium perchlorate, sodium tetrafluoro borate, sodium hexafluoro arsenate, sodium bis(trifluoromethane sulphone)imide, sodium bis(oxalate)borate, and combinations of any of the foregoing.

In some embodiments, the electrolyte composition 106 can include an electrolyte solvent. Any conventional lithium ion electrochemical electrolyte solvent can be used for the ionically conductive composition 1400. Suitable electrolyte solvents include, but are not limited to, for example, ethylene carbonate, dimethyl carbonate, propylene carbonate, dimethoxyethane, dioxolane, ethyl methyl carbonate, various ionic liquids, and combinations of any of the foregoing. Examples of ionic liquids include, but are not limited to, for example, N-alkyl-N-methylpyrrolidinium bis(trifluoromethanesulfonyl)-imide, N-alkyl-N-methylpyrrolidinium bis(fluorosulfonyl)imide, and 1-ethyle-3-methyl-imidazolium bis(trifluoromethanesulfonyl)imide. A mixture of ethylene carbonate and dimethyl carbonate is often used as a solvent in preparing electrolytes, a commonly used mixture being 3:7 weight % ratio mixture of ethylene carbonate and dimethyl carbonate (for example, a mixture containing 30 grams ethylene carbonate and 70 grams dimethyl carbonate), referred to elsewhere herein as 3:7 EC/DMC.

In some embodiments, the electrolyte composition 106 can include an electrolyte additive. Conventional electrolyte additives may also be used; examples include, but are not limited to fluorinated ethylene carbonate, vinyl carbonate to promote solid electrolyte interface (SEI) formation on the anode or cathode with no substantial effect on shear thickening.

In some embodiments, the electrolyte composition 106 can include no more than about 10M, no more than about 8 M, no more than about 6M, no more than about 4M, no more than about 2M, or no more than about 1M, inclusive of an electrolyte salt. Combinations of the above-referenced thicknesses are also possible (e.g., at least about 0.1M and no more than about 10M, or at least about 1M and no more than about 6M), inclusive of all values and ranges therebetween.

In some embodiments, the electrolyte composition 106 can include a binder selected from at least one of polyvinylidene fluoride (PVDF), polyethylene oxide (PEO), polyacrylic acid (PAA), styrene-butadiene rubber (SBR), carboxymethyl cellulose (CMC), or polysulfone (PSU).

In some embodiments, the electrolyte composition 106 can include a particle suspension agent (e.g., for suspending the shear thickening particles 108). In some embodiments, the particle suspension agent can include a stabilization polymer(s) covalently bound to the surface of the shear thickening particles 108, and/or a stabilizing surfactant. Any suitable particle suspension agent that can be used in the electrolyte composition 106, for example, any suitable particle suspension agent described in U.S. Pat. No. 10,347, 945, issued Jul. 9, 2019, and U.S. Pat. No. 9,760,846, issued Sep. 12, 2017, the disclosure of which are incorporated herein by reference in their entirety.

In some embodiments, the particle suspension agent can include a stabilizing surfactant. In some embodiments, the shear thickening particles 120 can have an electrochemical double layer, and the particle suspension agent can have a chain length of greater than double the thickness of the electrochemical double layer. In some embodiments, the stabilizing surfactant can include a first portion for adsorbing to the particles, and a second portion that is absorbed in the solvent. In some embodiments, a length of the surfactant from the first portion to the second portion can be greater than twice the thickness of the electrochemical double layer.

In some embodiments, the stabilizing surfactant can include a first portion for adsorbing to the shear thickening particles 108, and a second portion that is absorbed in the electrolyte composition 106. The length of the surfactant from the first portion to the second portion can be greater than twice the thickness of the electrochemical double layer. In some embodiments, the stabilizing surfactants (also commonly known as dispersants) can include one or more type of surfactants. As used herein, the term "surfactants" refers to compounds that lower the surface tension (or interfacial tension) between two liquids or between a liquid and a solid. Surfactants may act as a wetting agent and/or a dispersants. Surfactants are usually organic compounds that are amphiphilic; they contain both hydrophobic groups (the tails) and hydrophilic groups (the heads). Therefore, a surfactant contains both a water-insoluble component and a water-soluble component.

In some embodiments, the stabilizing surfactant can be a polymer with a chain length of at least about 1 nm, at least about 5 nm, at least about 10 nm, at least about 15 nm, at least about 20 nm, at least about 25 nm, at least about 30 nm, at least about 35 nm, at least about 40 nm, at least about 45 nm, at least about 50 nm, at least about 55 nm, at least about 60 nm, at least about 70 nm, or at least about 80 nm. In some embodiments, the stabilizing surfactant can be a polymer with a chain length of no more than about 100 nm, no more than about 90 nm, no more than about 80 nm, no more than about 70 nm, no more than about 60 nm, no more than about 55 nm, no more than about 50 nm, no more than about 45 nm, no more than about 40 nm, no more than about 35 nm, no more than about 30 nm, no more than about 25 nm, no more than about 20 nm, no more than about 15 nm, no more than about 10 nm, no more than about 5 nm, or no more than about 1 nm. Combinations of the above-referenced chain lengths are also possible (e.g., at least about 10 nm and no more than about 100 nm, or at least about 20 nm and no more than about 80 nm), inclusive of all values and ranges therebetween. In some embodiments, the stabilizing surfactant can be a polymer with a chain length of about 1 nm, about 5 nm, about 10 nm, about 15 nm, about 20 nm, about 25 nm, about 30 nm, about 35 nm, about 40 nm, about 45 nm, about 50 nm, about 55 nm, about 60 nm, about 70 nm, about 80 nm, about 90 nm, or about 100 nm, inclusive. In some embodiments, the stabilizing surfactant can also be a polymer including about 1 to about 145 monomer units.

In some embodiments, the stabilizing surfactant is electrochemically stable and electrically insulating. For example, the stabilizing surfactant can be stable to an operating voltage of 4.6 V in a cell. In some embodiments, the stabilizing surfactant can also be ionically conducting.

The stabilizing surfactant can be selected from many different polymers. In some embodiments, the stabilizing surfactant can be a polymer comprising monomer units including at least one of, or be selected from the group consisting of styrenes, acrylates, methacrylates, acrylonitrile, acrylamides, methacrylamides, 4-vinylpyridine, 2,2'-dichloroethene, 2-methyl-1,3-butadiene, acrylic acids, methacrylic acids, vinyl ester, N-vinyl carbazole, and N-vinyl pyrrolidone and mixtures thereof. In some embodiments, the stabilizing surfactant can include poly(methyl methacrylate) (PMMA). Mixtures of surfactants are also possible and can be selected with specific functional groups to optimize interactions with the salts or solvents.

In some embodiments, the stabilizing surfactant can include a polyelectrolyte. The polyelectrolyte can include at least one of, or be selected from the group consisting of pectin, carrageenan, alginates, polyacrylic acid, poly(sodium styrene sulfonate) (PSS), polymethacrylic acid, poly (2-acrylamido-2-methyl-1-propanesulfonic acid), poly(2-acrylamido-2-methyl-1-propanesulfonic acid-co-acrylonitrile), poly(styrene sulfonic acid), poly(4-styrenesulfonic acid-co-maleic acid), and poly(vinylsulfonic acid).

In some embodiments, the shear thickening particles 108 can have an isoelectric point (IEP), and if 6<IEP<12, the surfactant is anionic; if 0<IEP<8, the surfactant is cationic, and if 6≤IEP≤8, the surfactant can be either anionic or cationic. The anionic surfactant can include at least one selected from the group consisting of polyacrylic acid, polystyrene sulfonic acid, esters, polyvinyl sulfonic acid, and alkyl ether phosphate. In some embodiments, the cationic surfactant can include quaternary ammonia. In some embodiments, the surfactant can be nonionic if 0≤IEP≤12. In some embodiments, the nonionic surfactant can include at least one selected from the group consisting of ester and carboxylic acid functionality.

In some embodiments, the stabilizing surfactant can include at least one of sodium dodecyl sulfate, polyethylene glycol, polystyrene sulfonate, alkyl ether phosphate, polyacrylic acid, polyethyleneimine, or various Triton types (X-100, X-102, X-114, X-405).

The shear thickening particles 108 are capable of forming a plurality of agglomerates upon receiving an impact when the shear thickening particles 108 are suspended and/or dispersed in the electrolyte composition 106. In some embodiments, the shear thickening particles 108 can lead to increase in viscosity of the electrolyte composition 106 upon receiving an impact (e.g., collisions, vibrations, compressions, and/or shearing force). In some embodiments, viscosity of the electrolyte composition 106 can increase by at least two times, at least three times, at least four times, at least five times, at least six times, at least seven time, at least eight times, at least nine times, at least ten times, at least fifteen times, at least twenty times, at least twenty-five times, or at least thirty times, inclusive, from the viscosity of the composition prior to the impact.

In some embodiments, a viscosity of the electrolyte composition 106 can increase by at least an order of magnitude from the viscosity of the electrolyte composition prior to the impact. In some embodiments, the impact results in a shear rate of at least about 75 s$^{-1}$, at least about 80 s$^{-1}$, at least about 85 s$^{-1}$, at least about 90 s$^{-1}$, at least about 95 s$^{-1}$, at least about 100 s$^{-1}$, at least about 110 s$^{-1}$, at least about 120 s$^{-1}$, at least about 130 s$^{-1}$, at least about 140 s$^{-1}$, at least about 150 s$^{-1}$, at least about 160 s$^{-1}$, at least about 170 s$^{-1}$, at least about 180 s$^{-1}$, at least about 190 s$^{-1}$, at least about 200 s$^{-1}$, at least about 250 s$^{-1}$, or at least about 300 s$^{-1}$. Shear thickening involves the rapid organization of shear thickening particles 120 with the application of stress. The size of these particles resists flow making the material appear solid-like or have a solid-like texture.

The shear thickening particles 108 can be formed from any suitable material that can lead to a formation of agglomerates that form a solid-like composition upon receiving an impact. In some embodiments, the shear thickening particles 108 can be made from at least one of a polymer or a ceramic. In one embodiment, the shear thickening particles 108 are made from a ceramic. In some embodiments, the shear thickening particles 108 are electrically non-conducting particles. In some embodiments, the electrically non-conducting particles are selected from at least one of TiO$_2$, Al$_2$O$_3$, ZrO$_2$, Y$_2$O$_3$, HfO$_2$, GeO$_2$, Sc$_2$O$_3$, CeO$_2$, MgO, BN, SiO$_2$, B$_2$O$_3$, Li$_3$N or Li$_2$S. In some embodiments, the shear thickening particles 108 can include silica particles. In some embodiments, the silica particles can be derived from diatomaceous earth. In some embodiments, the silica particles can be derived from the Stober process. In some embodiments, the shear thickening particles 108 are coated with a covalently bound, sterically repulsive polymer, or a surfactant/dispersant or both.

The shear thickening particles 108 can have any suitable shape that allows proper dispersion (e.g., substantially homogenous dispersion) of the shear thickening particles 108 within a liquid composition. In some embodiments, the shear thickening particles 108 are spheroidal and/or spherical. As used herein, the term "spheroidal" means that the shape resembles that of a sphere but is not perfectly round ("quasi-spherical"), for example an ellipsoidal shape. The shape and size of shear thickening particles 120 may be identified by means of photographs taken by microscope, in particular using a device such as a transmission electron microscope (TEM) or scanning electron microscope (SEM).

In some embodiments, the shear thickening particles 108 can have an average particle size of at least about 50 nm, at least about 100 nm, at least about 150 nm, at least about 200 nm, at least about 250 nm, at least about 300 nm, at least about 350 nm, at least about 400 nm, at least about 450 nm, at least about 500 nm, at least about 550 nm, at least about 600 nm, at least about 650 nm, at least about 700 nm, at least about 750 nm, at least about 800 nm, at least about 850 nm, at least about 900 nm, or at least about 950 nm. In some embodiments, the shear thickening particles 108 can have an average particle size of no more than about 1 μm, no more than about 950 nm, no more than about 900 nm, no more than about 850 nm, no more than about 800 nm, no more than about 750 nm, no more than about 700 nm, no more than about 650 nm, no more than about 600 nm, no more than about 550 nm, no more than about 500 nm, no more than about 450 nm, no more than about 400 nm, no more than about 350 nm, no more than about 300 nm, or no more than about 250 nm. Combinations of the above-referenced particle sizes are also possible (e.g., at least about 50 nm and no more than about 1 μm, or at least about 300 nm and no more than about 900 nm), inclusive of all values and ranges therebetween. In some embodiments, the shear thickening particles 108 can have an average particle size of about 50 nm., about 100 nm, about 150 nm, about 200 nm, about 250 nm, about 300 nm, about 350 nm, about 400 nm, about 450 nm, about 500 nm, about 550 nm, about 600 nm, about 650 nm, about 700 nm, about 750 nm, about 800 nm, about 850 nm, about 900 nm, about 950 nm, or about 1 μm.

In some embodiments, the shear thickening particles 108 can be selected to have a polydispersity index of no greater than 0.3. In some embodiments, the shear thickening particles 108 can have a polydispersity index of no greater than 0.2. In some embodiments, the shear thickening particles 108 can have a polydispersity index of no greater than 0.07.

In some embodiments, the shear thickening particles 108 can be essentially free of materials that volatilize at low temperatures. The shear thickening particles 108 can be essentially free of materials that volatilize at 80° C. or more. The shear thickening particles 108 can be essentially free of materials that volatilize at 110° C. The shear thickening particles 108 can be essentially free of materials that volatilize at 120° C.

The shear thickening particles 108 within the electrolyte composition 106 can have an absolute zeta potential of greater than ±30 mV, at least about ±35 mV, at least about ±40 mV, at least about ±45 mV, at least about ±50 mV, at least about ±55 mV, or at least about ±60 mV. The shear thickening particles 1320a, 1320b within the electrolyte composition 106 can have an absolute zeta potential of greater than ±30 mV, at least about ±35 mV, at least about ±40 mV, at least about ±45 mV, at least about ±50 mV, at least about ±55 mV, or at least about ±60 mV, inclusive. Combinations of the above-referenced zeta potential values are also possible (e.g., at least about ±40 mV and no more than about ±60 mV or at least about ±50 mV and no more than about ±55 mV, inclusive), inclusive of all values and ranges therebetween. In some embodiments, the shear thickening particles 108 within the electrolyte composition 106 can have an absolute zeta potential of about ±30 mV, about ±35 mV, about ±40 mV, about ±45 mV, about ±50 mV, about ±55 mV, or about ±60 mV, inclusive. The shear thickening particles 108 within the electrolyte composition 106 can have an absolute zeta potential of about ±30 mV, about ±35 mV, about ±40 mV, about ±45 mV, about ±50 mV, about ±55 mV, or about ±60 mV, inclusive.

In some embodiments, the loading of the shear thickening particles 108 within the electrolyte composition 106 may be high enough to form a suitable colloidal network (the network including a plurality of agglomerates) with a detection of an event (e.g., collisions, vibrations, compressions, and/or shearing force). In some embodiments, if the particle loading is not high enough, there may not be enough particles to create shear thickening behavior. On the other hand, if the particle loading is too high, then the colloids may fill all available space that will prevent the formation of shear thickening electrolyte behavior during operation of the electrochemical.

The shear thickening particles 108 can be present in within the electrolyte composition 106 in an amount in a range of about 10 wt. % to about 80 wt. %, for example, at least about 15 wt. %, at least about 20 wt. %, at least about 25 wt. %, at least about 30 wt. %, at least about 35 wt. %, at least about 40 wt. %, at least about 45 wt. %, at least about 50 wt. %, at least about 55 wt. %, at least about 60 wt. %, at least about 65 wt. %, at least about 70 wt. %, or at least about 75 wt. %, inclusive based on the total weight of the electrolyte composition 106. In some embodiments, the shear thickening particles 108 can be included in the electrolyte composition 106 in an amount of no more than about 80 wt. %, no more than about 75 wt. %, no more than about 70 wt. %, no more than about 65 wt. %, no more than about 60 wt. %, no more than about 55 wt. %, no more than about 50 wt. %, no more than about 45 wt. %, no more than about 40 wt. %, no more than about 35 wt. %, no more than about 30 wt. %, no more than about 25 wt. %, no more than about 20 wt. %, or no more than about 15 wt. %, inclusive based on the total weight of the electrolyte composition 106. Combinations of the above-referenced concentrations are also possible (e.g., at least about 20 wt. % and no more than about 70 wt. % or at least about 30 wt. % and no more than about 60 wt. %), inclusive of all values and ranges therebetween. In some embodiments, the shear thickening particles 108 can be present in the electrolyte composition 106 in an amount of about 10 wt. %, about 15 wt. %, about 20 wt. %, about 25 wt. %, about 30 wt. %, about 35 wt. %, about 40 wt. %, about 45 wt. %, about 50 wt. %, about 55 wt. %, about 60 wt. %, about 65 wt. %, about 70 wt. %, about 75 wt. %, or about 80 wt. %, or within a range of any high and low value among these, based on the total weight of the electrolyte composition 106.

In some embodiments, the transducer 110 is situated, located, or disposed proximate to the electrochemical cell 100. For example, the transducer 110 may be located on the electrochemical cell 100 within a distance 116 of the plurality of shear thickening particles 108. This distance 116 may be less than a predetermined distance (e.g., 0.1 m), which is based on an electrical limit associated with the transducer 110. The transducer 110 may have a current rating that limits the output of energy, such as mechanical, acoustic, elastic, thermal, or magnetic energy. The predetermined distance ensures that waves or impulses generated by the transducer 110 have an amplitude 118 or magnitude greater than zero, or greater than a predetermined threshold, when they reach the shear thickening particles 108, ensuring that agglomeration occurs in response to the stimulation provided by the transducer 110.

In some embodiments, the transducer 110 forms a geometry that mimics the shape of one or more portions of the electrochemical cell. The transducer 110 may cover one or more portions of the electrochemical cell, forming an axis where the portions of the electrochemical cell surround the transducer 110 radially. The energy from the transducer 110 may cause a reduction in ionic conductivity between the electrolyte solvent and the electrolyte salt. In some embodiments, the energy is mechanical (e.g., vibrational energy) and forms one or more waves that propagate from the transducer 110, with a frequency in a range of greater than about 16 Hz and less than about 20 kHz, inclusive. The distance between the transducer 110 and the shear thickening particles 108 may be less than a predetermined distance, based on the electrical limit of the transducer 110. The amplitude or magnitude of the waves generated by the transducer 110 can be greater than zero or a predetermined threshold when they reach the shear thickening particles 108.

In some embodiments, the shear thickening particles 108 can be sized (e.g., have a diameter) in a range of about 50 nanometers to micrometers and have an absolute zeta potential greater than 40 millivolts. The transducer 110 may be an acoustic transducer, a piezoelectric transducer, a haptic transducer, a mechanical actuator, or an electric machine transducer. One or more of the electrolyte solvent, the electrolyte salt, or the shear thickening particles 108 may form a membrane of the electrochemical cell. The energy from the transducer 110 may cause an increase in the acquired shear modulus of the electrolyte solvent and the electrolyte salt.

In some embodiments, the transducer 110 includes multiple elements to generate energy, such as mechanical, acoustic, elastic, thermal, or magnetic energy. The transducer 110 is formed and sized to cover one or more portions of the outer housing of the electrochemical cell, potentially covering the entire outer housing and mimicking its shape.

In some embodiments, the shear thickening particles 108 can lead to an increase in the viscosity of the electrolyte composition 106 upon receiving an impact force, such as, for example, due to a collisions, vibrations, compressions, or shearing forces. The transducer 110 can respond to various events, such as vibrations during the normal operation of a vehicle traveling at speeds up to 330 miles per hour, or during normal electrical states. These events can trigger the transducer 110 to emit energy waves that interact with the shear thickening particles 108, causing them to agglomerate and increase the viscosity of the electrolyte composition 106. This interaction ensures the stability and performance of the electrochemical cell under different operating conditions.

In some embodiments, the event can be an impact applied directly to the electrochemical cell 101. In some embodiments, the event can include a force or condition affecting the electrochemical cell, including mechanical deformation, stress, or any external interaction influencing structural and/or operational performance of the electrochemical cell 101.

In some embodiments, the controller 112 is configured to manage the flow of electric current to the transducer 110, which interacts with shear thickening particles 108. The controller 112 is in electrical communication with the transducer 110 and is configured to detect events that necessitate the activation of the transducer 110. In some embodiments, the controller 112 provides electric current to the transducer 110. The frequency of this current is based on the frequency response of the shear thickening particles 108, providing the desired interaction.

In some embodiments, the controller 112 can be equipped with sensors and circuitry to detect various events. These events can include thermal transients, electrical transients, impacts, or other anomalies associated with the electrochemical cell or its environment.

In some embodiments, the controller 112 uses predefined threshold values to determine when an event is significant enough to warrant a response. For example, if the temperature or electrical load exceeds a certain limit or threshold value, the controller 112 may recognize this as an event. In some embodiments, upon detecting an event that surpasses the threshold value, the controller 112 sends a flow of electric current to the transducer 110. This current activates the transducer 110, which then interacts with the shear thickening particles 108 (e.g., generates vibrations communicated to the shear thickening particles 108) to mitigate or prevent the detected event.

In some embodiments, the electric current provided by the controller 112 is tuned to the resonant frequencies of the shear thickening particles 108. This tuning provides the desired response from the particles, enhancing their thickening properties. In some embodiments, when an event is detected, the controller 112 evaluates the severity based on the threshold values. If the event is above the threshold, the controller 112 closes a switch or generates the necessary electric current to activate the transducer 110. In some embodiments, the controller 112 can receive both analog and digital signals indicating an event. These signals can be processed to determine if the event exceeds the threshold value.

In some embodiments, if the electrochemical cell 101 experiences a rapid increase in temperature, the controller 112 can detect this thermal transient. If the temperature rise exceeds the predefined threshold, the controller 112 can activate the transducer 110 by providing a tuned electric current. The transducer 110 then interacts with the shear thickening particles 108 to absorb and dissipate the excess heat, protecting the electrochemical cell 101.

FIG. 1B shows a block diagram of the controller 112. While FIG. 1B illustrates a particular embodiment of the controller 112, any other suitable controller configured to perform the operations described herein may be used. In some embodiments, the controller 112 includes a processor 172, a memory 174, and an input/output (I/O) interface 176. In some embodiments, the controller 112 is configured to manage the flow of electric current to the transducer 110, which interacts with shear thickening particles 108.

The processor 113 may be implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 115 stores data and/or computer code for facilitating various processes described herein. The I/O interface 117 is structured for sending and receiving data from the controller 112.

In some embodiments, the controller 112 includes various modules configured to perform its operations. For example, the controller 112 includes a cell operation module 115a, a baseline parameter determination module 115b, and an event determination module 115c. These modules are embodied as machine-readable media stored in the memory 115 and executable by the processor 113. The machine-readable media facilitate performance of certain operations, such as acquiring data and defining the frequency of data acquisition or transmission.

In some embodiments, the cell operation module 115a, the baseline parameter determination module 115b, and the event determination module 115c may take the form of one or more analog circuits, electronic circuits, telecommunication circuits, hybrid circuits, or any other type of circuit. These circuits may include components such as transistors, logic gates, resistors, multiplexers, registers, capacitors, inductors, diodes, and wiring.

In some embodiments, the cell operation module 115a is configured to receive sensing signals from the electrochemical cell and process these signals. In some embodiments, the cell operation module 115a may include a piezoelectric vibration sensor configured to transform vibration signals into electrical signals that can be communicated by the controller 112. In some embodiments, the cell operation module 115a may include a photodetector configured to transform optical signals into electrical signals that can be communicated by the controller 112. The cell operation module 115a may also filter the sensing signals using hardware or software filters to remove noise from the raw signals. This module ensures that the data received from the electrochemical cell is accurate and usable for further processing.

In some embodiments, the baseline parameter determination module 115b is configured to analyze signals processed by the cell operation module 115a and determine baseline parameters of the electrochemical cell. This module generates a baseline parameter signal indicative of these parameters. The baseline parameters serve as reference points for normal operating conditions of the electrochemical cell. The baseline parameter determination module 115b works closely with the cell operation module 115a to continuously update and maintain accurate baseline data.

In some embodiments, processed signals from the electrochemical cell can include vibrations, which can be detected by a piezoelectric vibration sensor disposed within the cell operation module 115a. This sensor can convert the mechanical vibrations into electrical signals, allowing the system 100 to monitor the cell's physical state. By analyzing these signals, the baseline parameter determination module 115b can establish reference points for normal operating conditions. These baseline parameters can aid identifying any deviations that might indicate issues or inefficiencies within the cell.

In some embodiments, the event determination module 115c is configured to analyze processed signals and determine operational parameters of the electrochemical cell. This module generates an operational parameter signal indicative of these parameters. The operational parameters reflect or are indicative of the current state and performance of the electrochemical cell under various conditions. The event determination module 115c uses the data provided by the cell operation module 115a and compares it with the baseline parameters to detect any deviations or anomalies.

In some embodiments, the event determination module 115d is configured to detect events that necessitate the activation of the transducer 110. This module evaluates the operational parameters against predefined threshold values. Upon detecting an event that surpasses a predefined threshold value, the event determination module 115c can send a signal to the controller 112 to initiate a response. The controller 112 can then send a flow of electric current to the transducer 110. This current activates the transducer 110, which interacts with the shear thickening particles 108 to mitigate or prevent the detected event. The electric current provided by the controller 112 is tuned to the resonant frequencies of the shear thickening particles 108, providing the desired response from the particles.

In some embodiments, the cell operation module 115a can continuously receive and process sensing signals from the electrochemical cell. These processed signals can then be analyzed by the baseline parameter determination module 115b to establish and update baseline parameters. In some embodiments, event determination module 115c can analyze the same processed signals to determine the current operational parameters of the electrochemical cell.

In some embodiments, the event determination module 115d is configured to receive both baseline and operational parameter signals and compare them against predefined threshold values to detect any significant events. If an event is detected, the event determination module 115c triggers the controller 112 to send an electric current to the transducer 110, activating it to interact with the shear thickening particles 108 to cause the shear thickening particles to thicken as described herein, and mitigate the event.

Figure 2B:
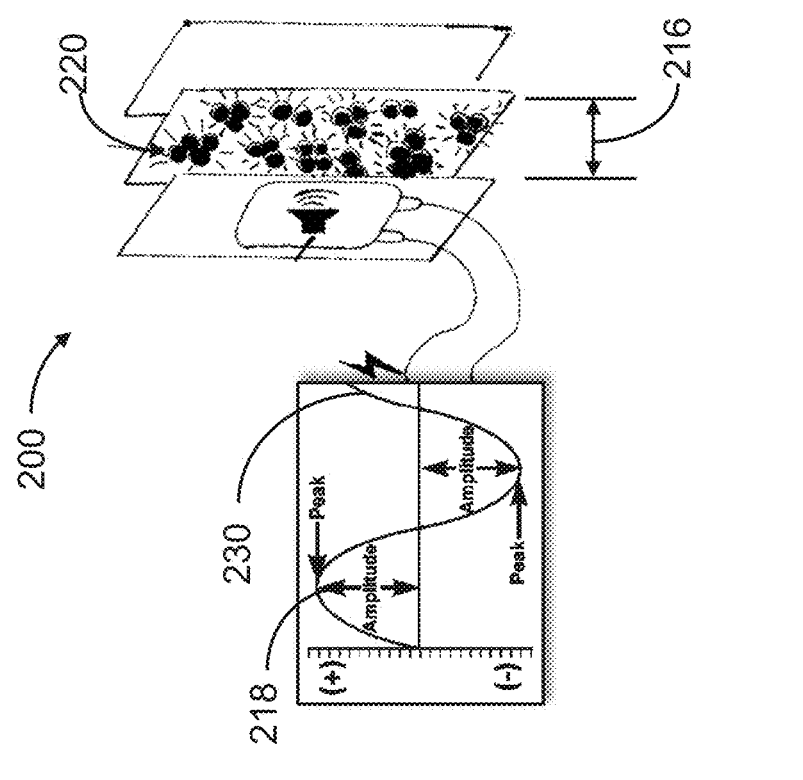
FIG. 2B depicts an activated transducer and agglomeration of shear thickening particles, according to an embodiment.
Figure 2A:
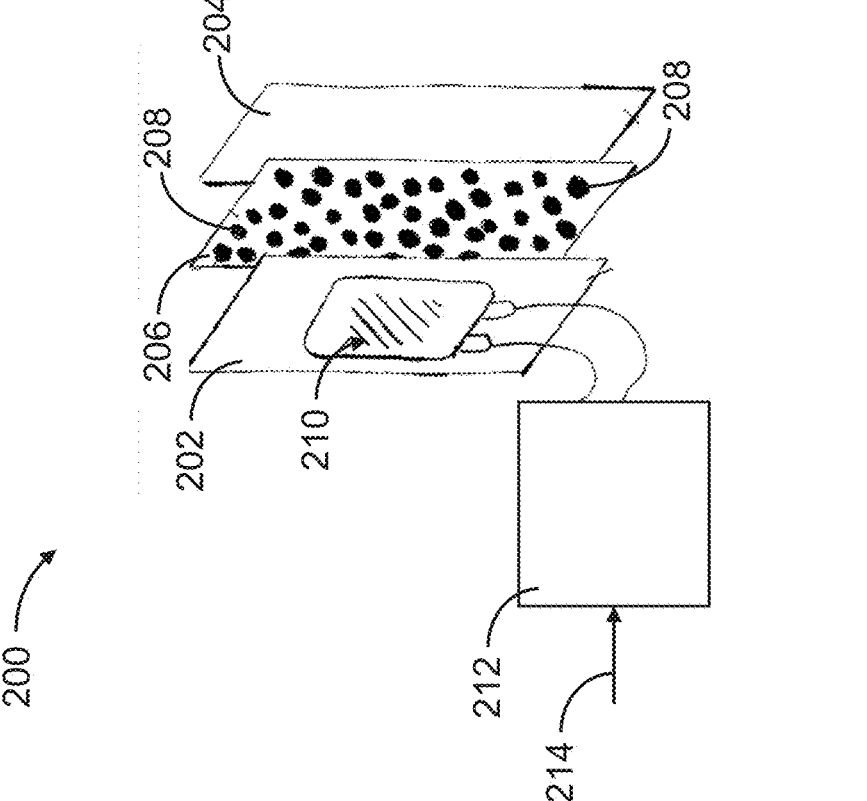
FIG. 2A depicts an electrochemical cell with a transducer and the non-agglomerated state of shear thickening particles, according to an embodiment.

FIG. 2A and illustrate an electrochemical cell system 200, shown before and after the activation of a controller 212, respectively, according to an embodiment. The electrochemical cell system 200 includes an electrochemical cell, a transducer 210 disposed proximate to the electrochemical cell, and a controller 212 operatively coupled to the transducer 210. The electrochemical cell includes an anode 202, a cathode 204, and an electrolyte composition 206 disposed between the anode 202 and the cathode 204. In FIG. 2A, the electrolyte composition 206 includes shear thickening particles 208 in a non-agglomerated state or configuration, according to an embodiment. In FIG. 2B, the electrolyte composition 206 includes the shear thickening particles 208 in an agglomerated state, according to an embodiment, after the activation of the transducer 210 by the controller 212.

The anode 202, the cathode 204, the electrolyte composition 206, the shear thickening particles 208, the transducer 210, and the controller 212 are similar to or substantially the same as the anode 102, the cathode 104, the electrolyte composition 106, the shear thickening particles 108, the transducer 210, and the controller 212, respectively, as described above with respect to FIG. 1. Accordingly, such components, features, aspects, etc., of the system 200 are not described in further detail herein.

The electrochemical cell shown in FIGS. 2A and 2B may include various chemistries, not limited to those described herein. The electrochemical cell is configured to convert chemical energy to electrical energy. The anode 202 and cathode 204 may be connected with conductive terminals for transporting voltage and current from the electrochemical cell to circuitry. In one or more variation, the circuitry is part of a vehicle (not shown) or another implement (back-up power supply, chassis).

In some embodiments, the shear thickening particles include ceramic particles, and the electrolyte composition 206 includes an electrolyte solvent, an electrolyte salt, and one or more ceramic particles 208. A transducer 210 is disposed proximate the electrochemical cell 200. For example, the transducer 210 may be situated on the electrochemical cell 200 within a distance 216 of the plurality of shear thickening 208. The distance 216 may be less than a predetermined quantity (e.g., 0.1 m). The predetermined quantity may be based on an electrical limit associated with the transducer. For example, the transducer may have a current rating that limits the output of energy (e.g., mechanical energy, acoustic energy, elastic energy, thermal energy, magnetic energy). The predetermined quantity may be determined to ensure that waves or impulses generated by the transducer have an amplitude 218 or magnitude greater than zero or greater than a predetermined threshold when they reach the plurality of shear thickening 208, ensuring that agglomeration 220 occurs in response to stimulation provided by the transducer 210.

The transducer 210 may be powered by a controller 212. The controller 212 may be, or be part of, or include: an Application Specific Integrated Circuit (ASIC); a digital, analog, or mixed analog/digital discrete circuit; a digital, analog, or mixed analog/digital integrated circuit; a shift register or other combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The controller 212 may also be a combination of circuitry (e.g., circuits, conductors, transistors, switches, resistors, capacitors, inductors) that outputs the electric current 230 to energize the transducer 210. In one or more variation, the controller 212 outputs the electric current 230 based on an input. For example, the controller 212 may output the electric current 230 based on an indication of an event. The event may be a thermal transient or electrical transient associated with the electrochemical cell 200 or an associated electrochemical cell. The event may be predicted to cause a thermal transient or an electrical transient of the electrochemical cell or an associated electrochemical cell. For example, the indication of the event may cause the controller 212 to close a switch or generate the electric current 230 for energizing the transducer 210. The electric current 230 may have a frequency. For example, the electric current 230 may have a frequency that is tuned to the resonant frequencies or other attributes specific to the plurality of ceramic particles 208 implemented and the quantity of ceramic particles within the electrolyte composition. The frequency may be further tuned to ensure ionic conduction is suppressed in response to the energy.

Figure 3B:
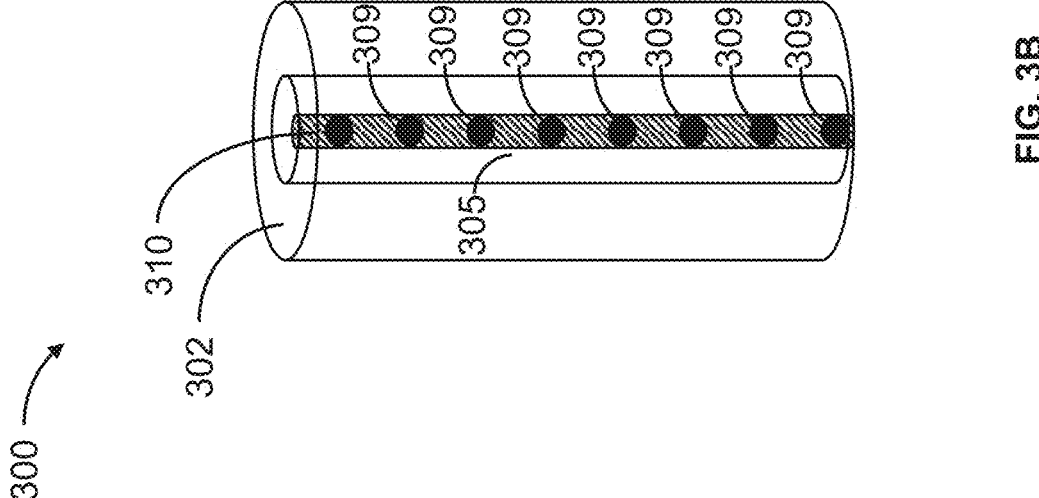
FIG. 3B depicts an electrochemical cell with a transducer located in the mandrel, according to an embodiment.
Figure 3A:
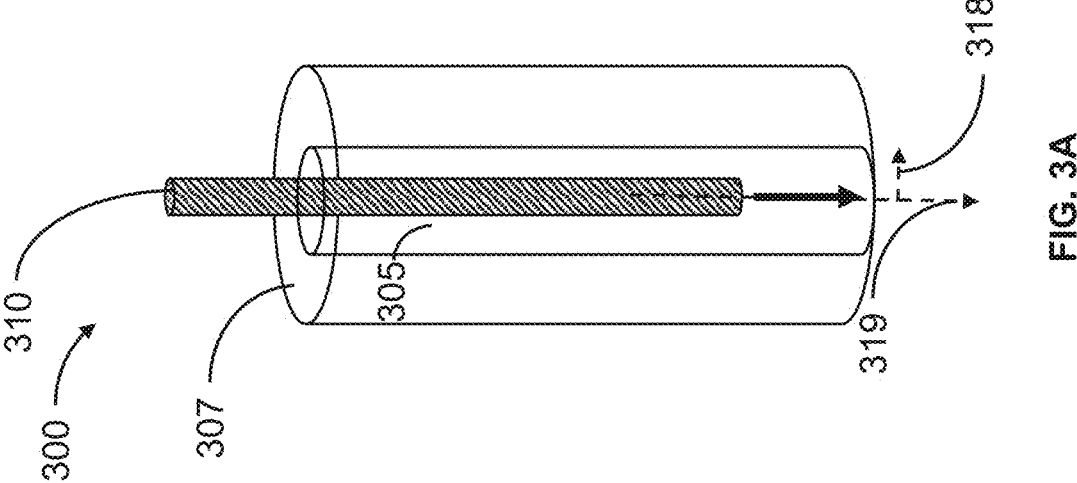
FIG. 3A depicts an electrochemical cell with a mandrel, according to an embodiment.

FIGS. 3A and 3B show an electrochemical cell system 300 with a mandrel 305, according to an embodiment. In some embodiments, the electrochemical cell system 300 is similar to or substantially the same as the electrochemical cell systems 100, 200 as describe above with respect to FIGS. 1A-1B, and 2A-2B. The electrochemical cell system 300 includes an outer housing 307 and a mandrel 305. In some embodiments, the transducer 310 is disposed within the mandrel 305 to ensure the distance between the transducer 310 and the plurality of shear thickening particles (e.g., ceramic particles) is less than the predetermined quantity. In some embodiments, the mandrel 305 surrounds the transducer 310 with respect to a radial direction 318 from axis 319. As shown, the mandrel 305 has a cylindrical shape and the transducer 310 has a similar cylindrical shape that is sized to fit within the mandrel 305. Other shapes (e.g., rectangular, non-geometric) are contemplated.

The transducer 310 may include multiple elements 309 to generate the energy (e.g., mechanical energy, acoustic energy, elastic energy, thermal energy, magnetic energy). A controller, same as or similar to the controller 112 described above, may energize one or more of the elements 306 at different frequencies, sequences, or otherwise to ensure the plurality of shear thickening particles 308 agglomerate. The elements 309 may include electrical connectors that extend to allow a conductive connection with the controller 312 (e.g., on the ends of the mandrel 305, ends of the transducer 310). The electrical connectors may be situated on a single surface, geometry, or end of the transducer 310 to provide connectivity.

Figure 4B:
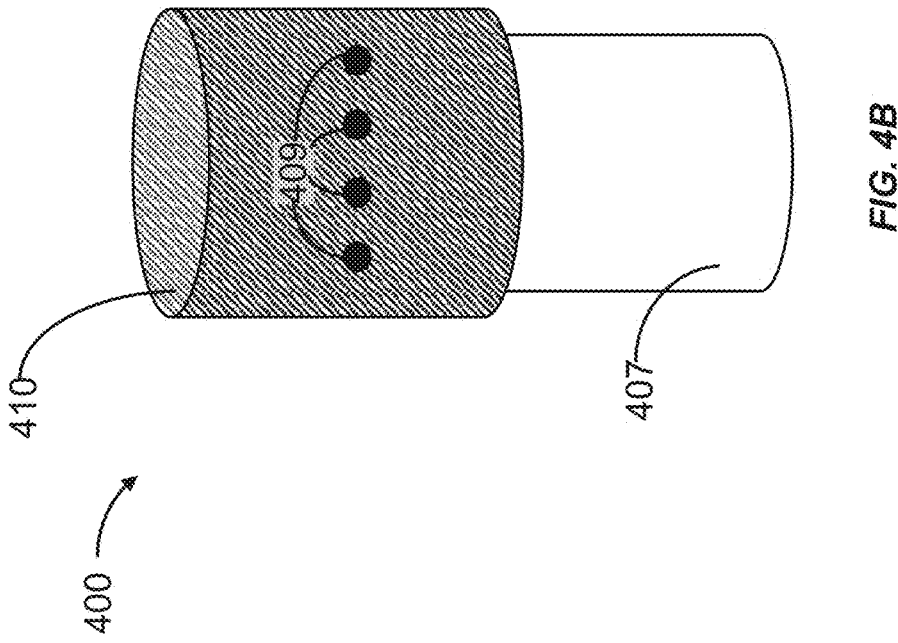
FIG. 4B depicts an electrochemical cell with a transducer, according to an embodiment.
Figure 4A:
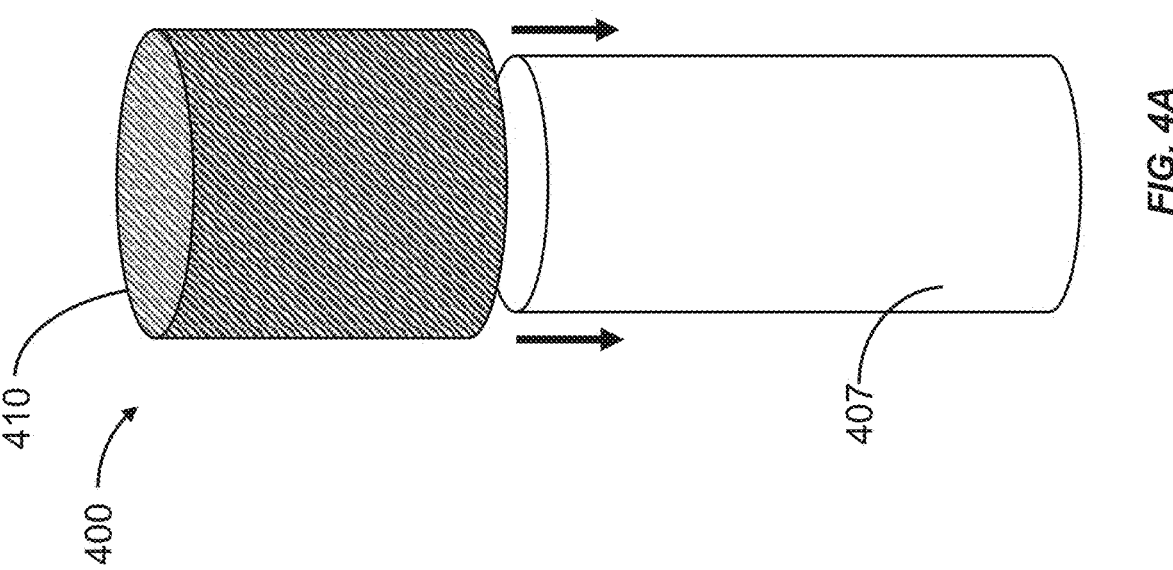
FIG. 4A depicts an electrochemical cell having a shape, according to an embodiment.

FIGS. 4A and 4B show an electrochemical cell system 400, according to an embodiment. In some embodiments, the electrochemical cell system 400 is similar to or substantially the same as the electrochemical cell systems 100, 200 as describe above with respect to FIGS. 1A-1B, and 2A-2B. The electrochemical cell 400 includes an outer housing 407. The outer housing 407 defines a cylindrical shape. As such, the transducer 410 is formed and sized to cover one or more portions of the outer housing 407. The transducer 410 may cover the entire outer housing 407. The transducer 410 may mimic the shape of the outer housing 407 or a mandrel as described above with respect to FIGS. 3A and 3B.

Figure 5:
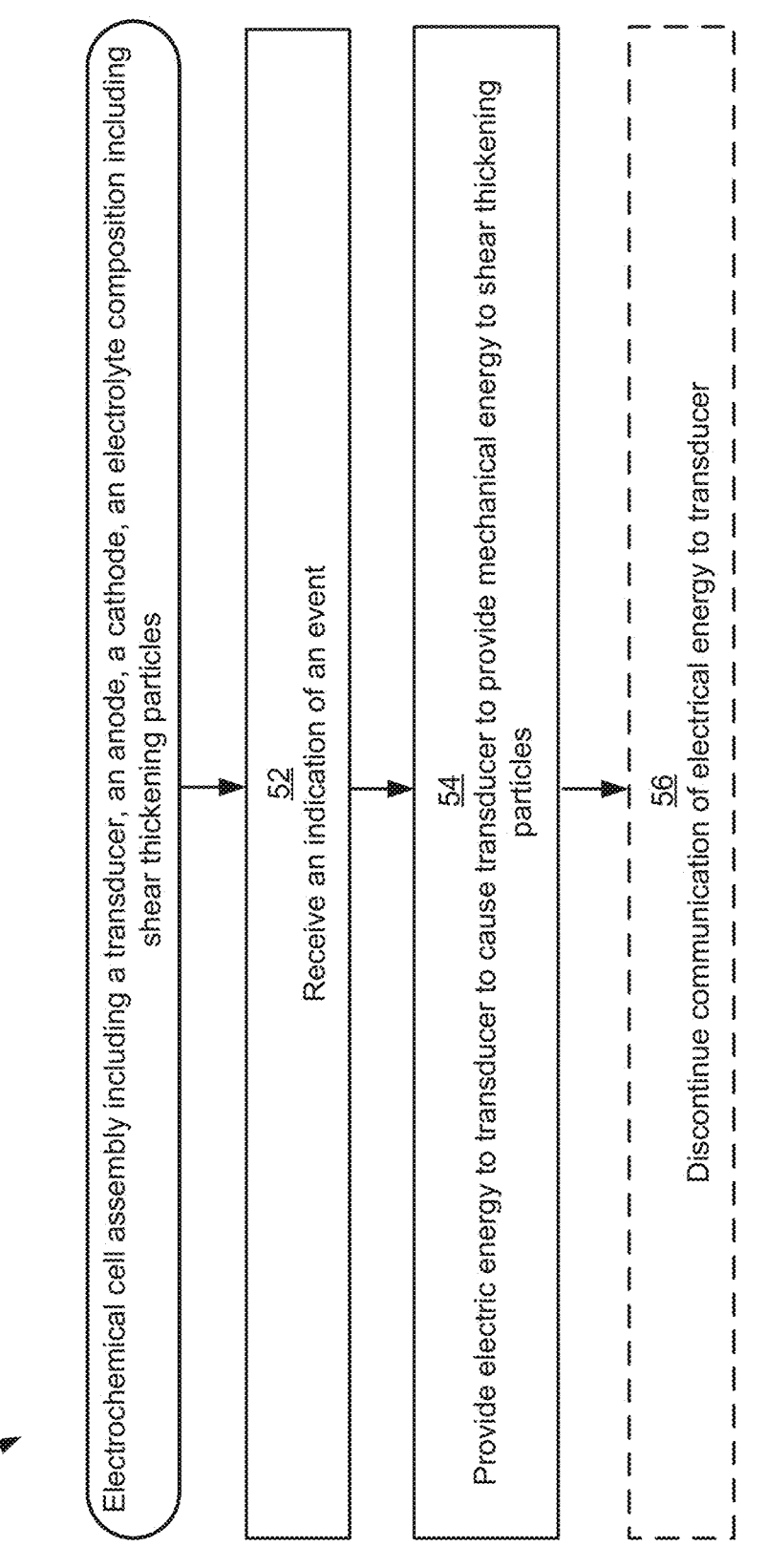
FIG. 5 depicts a method for activating an electrolyte composition, according to an embodiment.

FIG. 5 is a flow chart of a method 50 for activating an electrolyte composition, according to an embodiment. The steps of method 50 may be omitted, duplicated, rearranged, or otherwise adjusted. In some embodiments, the method 50 can be implemented in any of the electrochemical cell systems, or parts thereof, described in FIGS. 1A-1B, 2A-2B, 3A-3B, and 4A-4B. An electrochemical cell assembly can include an anode, a cathode, an electrolyte composition including a plurality of shear thickening particles, and a transducer, as described above according to the aforementioned embodiments. The method 50 includes receiving an indication of an event at step 52, providing an electric energy to the transducer to provide a mechanical energy to the plurality of shear thickening particles, at step 54, and optionally discontinuing communication of the electrical energy to the transducer, at step 56.

At step 52, an indication of an event is received. The indication, similar to or substantially same as the indication described above with respect to FIG. 2A. may be analog or digital and may be received any one of the controller as described above. The event may be a phenomenon or a predication of a phenomenon. For example, the event may be a thermal transient, electrical transient, another transient, external event, prediction thereof, or a combination thereof. The event may be based on an impact or Newtonian force, prediction thereof, or a combination thereof. The event may be an impact with a chassis or vehicle supporting the electrochemical cell. The event may be an electrical, chemical, physical, or other anomaly associated with the electrochemical cell 101 or 200, electrochemical assembly, another electrochemical cell, or the vehicle or system within which the electrochemical cell is integrated.

In some embodiments, the event can also include vibrations and collisions. These events can activate the controller, prompting it to take desired actions. Vibrations may be caused by mechanical disturbances or operational anomalies. Collisions, whether minor or significant, can affect the structural integrity of the electrochemical cell or its housing. These collisions can include impacts with other components within the system, external objects, or even other vehicles. Such impacts can lead to physical damage, misalignment, or even short circuits within the electrochemical system.

In step 54, an electric energy is provided to the transducer. In some embodiments, the electric energy may be provided to any one of the transducer as described above. In some embodiments, the electric energy may be in a form of an electric current. In some embodiments, the electric current can be an alternating current or a direct current. In some embodiments, the electric current, similar to or substantially same as the indication described above with respect to FIG. 2B, may have an amplitude or magnitude. The amplitude or magnitude may be tuned to the quantity, type, and/or size of the plurality of shear thickening particles as described above. The electric current may have a frequency. The frequency may be in the acoustic range (e.g., greater than about 16 Hertz (Hz) and less than 20 kHz). The frequency may be tuned to the quantity, type, and/or size of the plurality of shear thickening particles. At step 54, the electric energy (e.g., electric current) is converted into energy. In some embodiments, the transducer or other elements may convert an electric current to energy (e.g., mechanical energy, acoustic energy, elastic energy, thermal energy, magnetic energy). In some embodiments, the energy is a mechanical energy. The transducer or other elements may include a speaker, resonator, actuator, vibrator, haptic device, oscillator, or another implement.

At step 54, the plurality of shear thickening particles can receive the energy (e.g., an energy in the form of one or more waves) to mitigate or prevent the event. The energy can cause an agglomeration of the plurality of shear thickening particles, increasing the shear thickening of the electrolyte composition or another composition of the electrochemical cell. The energy may be in the form of waves, and the energy causes a suppression of ionic conductivity of the electrolyte solvent and the electrolyte salt. Deenergization of the transducer can allow the ionic conductivity to rebound toward or reach the original ionic conductivity. The energy can also cause an increase in the acquired shear modulus (stiffening) of the electrolyte and the electrolyte salt.

The quantity or magnitude of energy may be based on a predetermined quantity determined to ensure that waves or impulses generated by the transducer have an amplitude or magnitude greater than zero or greater than a predetermined threshold (e.g., acoustic force) when they reach the plurality of shear thickening particles, ensuring that agglomeration occurs in response to stimulation provided by the transducer. At step 56, the method 50 involves optionally discontinuing the communication of electrical energy to the transducer once the desired effect on the electrolyte composition has been achieved. The step 56 can aid improving the efficiency and longevity of the electrochemical cell system. By halting the electrical energy supply, the system can prevent unnecessary energy consumption and potential overheating of the transducer. In some embodiments, the step 56 can allow the electrolyte composition to stabilize after the mechanical energy has been applied, providing that the shear thickening particles have adequately agglomerated and/or the electrolyte's shear modulus has increased as intended.

This controlled deactivation helps maintain the balance between energy input and the mechanical properties of the electrolyte, optimizing the overall performance and safety of the electrochemical cell.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a shift register or other combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer. The description of the disclosure is merely exemplary in nature and, thus, variations that do not depart from the substance of the disclosure are intended to be within the scope of the disclosure. Such variations are not to be regarded as a departure from the spirit and scope of the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure. Where methods and steps described above indicate certain events occurring in a certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

What is claimed is:

1. An electrochemical cell assembly, comprising:
an anode disposed on an anode current collector;
a cathode disposed on a cathode current collector;
an electrolyte composition, at least a portion of the electrolyte composition disposed between the anode and the cathode, the electrolyte composition including an electrolyte solvent, an electrolyte salt, and a plurality of shear thickening particles; and
a transducer physically and/or communicatively coupled to at least one of the anode current collector or cathode current collector, the transducer configured to be selectively activated to deliver an amount of energy to the electrolyte composition via the at least one of the anode current collector or cathode current collector to cause the shear thickening particles to increase the viscosity of the electrolyte composition, the transducer configured to be selectively activated in response to receiving an event signal that is generated in response to an external event.

2. The electrochemical cell assembly of claim 1, wherein the plurality of shear thickening particles have an average particle size in a range of about 50 nm to about 1 $\mu$m.

3. The electrochemical cell assembly of claim 1, wherein the plurality of shear thickening particles have an absolute zeta potential of greater than 40 mV.

4. The electrochemical cell assembly of claim 1, wherein the plurality of shear thickening particles include at least one of $TiO_2$, $Al_2O_3$, $ZrO_2$, $Y_2O_3$, $HfO_2$, $GeO_2$, $Sc_2O_3$, $CeO_2$, MgO, BN or $SiO_2$.

5. The electrochemical cell assembly of claim 1, wherein the amount of energy delivered causes a reduction in ionic conductivity of the electrolyte composition.

6. The electrochemical cell assembly of claim 1, wherein the amount of energy delivered causes the plurality of shear thickening particles to form agglomerates.

7. The electrochemical cell assembly of claim 1, wherein the energy forms one or more wave(s) having a wave frequency greater than a baseline frequency.

8. The electrochemical cell assembly of claim 7, wherein the wave frequency is between about 16 Hertz (Hz) and about 20 kHz.

9. The electrochemical cell assembly of claim 1, wherein the energy is a mechanical energy.

10. The electrochemical cell assembly of claim 1, wherein the transducer includes at least one of an acoustic transducer, a piezoelectric transducer, a haptic transducer, a mechanical actuator, or an electric machine transducer.

11. The electrochemical cell assembly of claim 1, further comprising:
a separator disposed between the anode and the cathode, wherein the electrolyte composition includes:

a first electrolyte composition, at least a portion of the first electrolyte composition disposed between the anode and the separator, and
a second electrolyte composition, at least a portion of the second electrolyte composition disposed between the cathode and the separator, at least one of the first electrolyte composition or the second electrolyte including the plurality of shear thickening particles.

12. The electrochemical cell assembly of claim 1, wherein the event signal includes an electrical current having a frequency.

13. The electrochemical cell assembly of claim 12, wherein the frequency is based on a frequency response of the plurality of shear thickening particles.

14. The electrochemical cell assembly of claim 1, wherein the external event includes an impact associated with a chassis supporting an electrochemical cell.

15. The electrochemical cell assembly of claim 1, wherein the transducer forms a geometry that mimics a shape of one or more portions of an electrochemical cell.

16. An electrochemical cell assembly, comprising:
an anode disposed on an anode current collector;
a cathode disposed on a cathode current collector;
an electrolyte composition, at least a portion of the electrolyte composition disposed between the anode and the cathode, the electrolyte composition including an electrolyte solvent, an electrolyte salt, and a plurality of shear thickening particles; and
a transducer physically and/or communicatively coupled to at least one of the anode current collector or cathode current collector, the transducer configured to be selectively activated to deliver an amount of energy to the electrolyte composition via the at least one of the anode current collector or cathode current collector to cause the shear thickening particles to increase the viscosity of the electrolyte composition, wherein the transducer is configured to be selectively activated in response to receiving an event signal, the event signal including an electrical current having a frequency based on a frequency response of the plurality of shear thickening particles.

17. The electrochemical cell assembly of claim 16, wherein the plurality of shear thickening particles have an average particle size in a range of about 50 nm to about 1 $\mu$m.

18. The electrochemical cell assembly of claim 16, wherein the plurality of shear thickening particles have an absolute zeta potential of greater than 40 mV.

19. The electrochemical cell assembly of claim 16, wherein the plurality of shear thickening particles include at least one of $TiO_2$, $Al_2O_3$, $ZrO_2$, $Y_2O_3$, $HfO_2$, $GeO_2$, $Sc_2O_3$, $CeO_2$, MgO, BN or $SiO_2$.

20. The electrochemical cell assembly of claim 16, wherein the amount of energy delivered causes a reduction in ionic conductivity of the electrolyte composition.

21. The electrochemical cell assembly of claim 16, wherein the amount of energy delivered causes the plurality of shear thickening particles to form agglomerates.

22. The electrochemical cell assembly of claim 16, wherein the transducer includes at least one of an acoustic transducer, a piezoelectric transducer, a haptic transducer, a mechanical actuator, or an electric machine transducer.

\* \* \* \* \*